United States Patent
Mutch et al.

(10) Patent No.: US 11,884,775 B2
(45) Date of Patent: Jan. 30, 2024

(54) RENEWABLY SOURCED SOIL RELEASE POLYESTERS

(71) Applicant: Clariant International Ltd., Muttenz (CH)

(72) Inventors: Kevin Mutch, Frankfurt (DE); Martijn Gillissen, Frankfurt (DE)

(73) Assignee: Clariant International Ltd., Muttenz (CH)

( * ) Notice: Subject to any disclaimer, the term of this patent is extended or adjusted under 35 U.S.C. 154(b) by 208 days.

(21) Appl. No.: 16/767,311

(22) PCT Filed: Nov. 27, 2018

(86) PCT No.: PCT/EP2018/082718
§ 371 (c)(1),
(2) Date: May 27, 2020

(87) PCT Pub. No.: WO2019/105938
PCT Pub. Date: Jun. 6, 2019

(65) Prior Publication Data
US 2020/0407494 A1    Dec. 31, 2020

(30) Foreign Application Priority Data
Nov. 28, 2017 (EP) ..................... 17204063

(51) Int. Cl.
*C11D 3/37* (2006.01)
*C08G 63/672* (2006.01)
*C11D 3/00* (2006.01)

(52) U.S. Cl.
CPC .......... *C08G 63/672* (2013.01); *C11D 3/0036* (2013.01); *C11D 3/3715* (2013.01)

(58) Field of Classification Search
CPC ... C11D 3/0036; C11D 3/3707; C11D 3/3711; C11D 3/3715; C11D 3/3757; C08G 63/672
See application file for complete search history.

(56) References Cited

U.S. PATENT DOCUMENTS

| | | | |
|---|---|---|---|
| 2,182,306 A | 12/1939 | Ulrich | |
| 2,208,095 A | 7/1940 | Esselmann | |
| 2,553,696 A | 5/1951 | Wilson | |
| 2,806,839 A | 9/1957 | Crowther | |
| 3,033,746 A | 5/1962 | Moyle | |
| 3,893,929 A | 7/1975 | Basadur | |
| 3,959,230 A | 5/1976 | Hays | |

(Continued)

FOREIGN PATENT DOCUMENTS

| CN | 1182751 | 5/1998 |
|---|---|---|
| DE | 19502181 A1 | 8/1996 |

(Continued)

OTHER PUBLICATIONS

International Search Report for PCT/EP2018/082718, dated Jan. 28, 2019, 2 pages.

(Continued)

*Primary Examiner* — Brian P Mruk
(74) *Attorney, Agent, or Firm* — Natali Richter

(57) ABSTRACT

A renewably sourced soil release polyester comprising two or more structural units (a1), one or more structural units (a2) and either one or two terminal structural groups (a3)

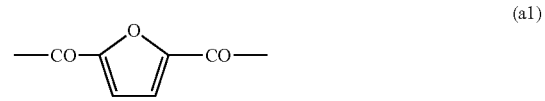

(a1)

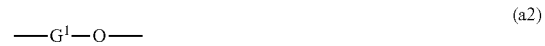

(a2)

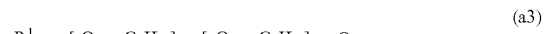

(a3)

wherein $G^1$ is one or more $(OC_nH_{2n})$ with n being a number of from 2 to 10, preferably from 2 to 6 and more preferably $(OC_2H_4)$, $(OC_3H_6)$, $(OC_4H_8)$ or $(OC_6H_{12})$, $R^1$ is a $C_{1-30}$ alkyl, preferably $C_{1-4}$ alkyl and more preferably methyl, p is, based on a molar average, a number of from 1 to 200, preferably from 2 to 150 and more preferably from 3 to 120, q is, based on a molar average, a number of from 0 to 40, preferably from 0 to 30, more preferably from 0 to 20, and most preferably from 0 to 10, where the $(OC_3H_6)$— and $(OC_2H_4)$-groups of the terminal group (a3) may be arranged blockwise, alternating, periodically and/or statistically, preferably blockwise and/or statistically, either of the groups $(OC_3H_6)$— and $(OC_2H_4)$— can be linked to $R^1$— and —O, adjacent structural units (a1) are connected by the structural unit (a2), in the case that only one terminal group (a3) is present in the polymer, the other terminal group is selected from the group consisting of OH, $OCH_3$, and $G^1OH$ and both terminal groups may be only linked to a structural unit (a1).

16 Claims, No Drawings

(56) References Cited

U.S. PATENT DOCUMENTS

| | | | |
|---|---|---|---|
| 3,962,152 A | 6/1976 | Nicol | |
| 4,132,680 A | 1/1979 | Nicol | |
| 4,702,857 A | 10/1987 | Gosselink | |
| 4,711,730 A | 12/1987 | Gosselink | |
| 4,713,194 A | 12/1987 | Gosselink | |
| 4,759,876 A | 7/1988 | Crossin | |
| 4,760,100 A | 7/1988 | McDaniel | |
| 4,956,447 A | 9/1990 | Gosselink | |
| 5,142,020 A | 8/1992 | Kud | |
| 6,153,723 A | 11/2000 | Lang | |
| 6,255,274 B1 | 7/2001 | Becherer | |
| 6,537,961 B1 | 3/2003 | Koch | |
| 7,790,665 B2 | 9/2010 | Lang | |
| 9,732,308 B2 | 8/2017 | Fischer | |
| 10,087,400 B2 | 10/2018 | Klug | |
| 10,240,107 B2 | 3/2019 | Cohrs | |
| 10,351,802 B2 | 7/2019 | Cohrs | |
| 10,961,484 B2 | 3/2021 | Klug | |
| 2001/0005737 A1* | 6/2001 | Loffler | C09K 23/16 524/762 |
| 2004/0254091 A1 | 12/2004 | Crass | |
| 2009/0036641 A1 | 2/2009 | Lang | |
| 2011/0098418 A1 | 4/2011 | Morschhaeuser | |
| 2013/0200290 A1 | 8/2013 | Morschhaeuser | |
| 2015/0203630 A1 | 7/2015 | Fischer | |
| 2015/0240029 A1 | 8/2015 | Fischer | |
| 2016/0280847 A1 | 9/2016 | Müssig | |
| 2016/0311208 A1* | 10/2016 | Nederberg | B32B 27/08 |
| 2017/0145348 A1* | 5/2017 | Klug | C11D 3/2044 |
| 2019/0330565 A1 | 10/2019 | Mutch | |
| 2020/0063070 A1 | 2/2020 | Mutch | |
| 2020/0207910 A1 | 7/2020 | Mutch | |
| 2020/0255766 A1 | 8/2020 | Green | |
| 2020/0407494 A1 | 12/2020 | Mutch | |
| 2021/0188759 A1 | 6/2021 | Cohrs | |
| 2021/0189290 A1 | 6/2021 | Cohrs | |
| 2021/0261728 A1 | 8/2021 | Arndt | |
| 2021/0371588 A1 | 12/2021 | Mutch | |

FOREIGN PATENT DOCUMENTS

| | | | |
|---|---|---|---|
| DE | 19735715 | 2/1999 | |
| DE | 102007013217 A1 | 9/2008 | |
| EP | 0035263 | 9/1981 | |
| EP | 0199403 | 10/1986 | |
| EP | 0336595 | 10/1989 | |
| EP | 0398137 | 11/1990 | |
| EP | 0042101 A1 | 8/1991 | |
| EP | 1106169 A2 | 6/2001 | |
| EP | 1106169 A3 | 10/2001 | |
| EP | 1966273 A1 | 9/2008 | |
| EP | 2276824 A1 | 1/2011 | |
| EP | 2966160 A1 | 1/2016 | |
| EP | 3071625 | 9/2016 | |
| EP | 3235848 | 10/2017 | |
| EP | 3360911 * | 8/2018 | C08G 63/20 |
| EP | 3710571 | 9/2020 | |
| GB | 1088984 | 10/1967 | |
| GB | 1466639 | 3/1977 | |
| JP | 2015-105373 * | 6/2015 | C09K 3/00 |
| WO | 9850509 | 11/1998 | |
| WO | 2006133867 A1 | 12/2006 | |
| WO | 2007138054 A1 | 12/2007 | |
| WO | 2018103895 | 6/2018 | |
| WO | 2019224030 A1 | 11/2019 | |
| WO | WO2019224030 | 11/2019 | |

OTHER PUBLICATIONS

Copending U.S. Appl. No. 17/926,058, filed Nov. 17, 2022.
International Search Report for PCT/EP2019/062165 dated Nov. 28, 2019, 3 pages.
International Search Report for PCT/EP2021/063267, dated Jul. 20, 2021, 13 pages.

* cited by examiner

RENEWABLY SOURCED SOIL RELEASE POLYESTERS

The invention relates to polyesters based on renewably sourced raw materials, a process for their preparation and their use as soil release agents. The polyesters are useful as soil release agents in laundry detergent and fabric care products.

Polyester containing fabrics can be surface modified to increase the hydrophilicity of the fabric, which can improve soil removal. Such surface modification can be achieved through direct treatment of the fabric, as outlined for example in GB 1,088,984, or more preferably through deposition of a surface modifying polymer in a washing process, as disclosed for example in U.S. Pat. No. 3,962,152. The renewable soil release finish imparted through washing ensures the continuous protection of the fiber from oily stains.

The polymers used in these processes typically consist of a polyester midblock with either one or two endblocks of polyethylene glycol, as further outlined in U.S. Pat. Nos. 3,959,230 and 3,893,929.

The use of nonionic soil release agents in liquid laundry detergents is well known in the art. GB 1,466,639, U.S. Pat. Nos. 4,132,680, 4,702,857, EP 0 199 403, U.S. Pat. Nos. 4,711,730, 4,713,194 and 4,759,876 disclose aqueous detergent compositions containing soil release polymers.

Typically the polyesters described in the prior art comprise glycol terephthalate or glycol terephthalate/polyglycol terephthalate co-polymers. This is governed by the fact that most polyesters used in fiber making comprise ethylene terephthalate units. This structural similarity between polyester substrate and soil release polymer is often considered to be a prerequisite for a functioning soil release polymer.

However, many of the polyesters described in the prior art are difficult to formulate in some laundry detergent formulations due to being too hydrophobic, moreover, they are based on raw materials sourced from non-renewable feedstocks such as crude oil. There is also a growing consumer perception that "phthalate"-based ingredients may pose a general health risk; polyethylene terephthalate—polyoxyethylene terephthalate polymers would fall into this group. In the interests of the environment and of consumer perception, there is, therefore, a drive for renewably sourced soil release polymers exhibiting improved cleaning on polyethylene terephthalate and polyethylene terephthalate containing materials, which are nevertheless themselves not based on terephthalates or at least contain reduced amounts of terephthalate units. In the extreme case of complete terephthalate replacement, this would allow the marketing of phthalate-free detergents displaying superior cleaning in the second and subsequent washes. Therefore, alternative structural moieties must be sought, which can be both renewably sourced and result in polymers with sufficient soil release properties.

Besides being based on raw materials sourced from non-renewable feedstocks, polyesters described in the prior art are prepared in high energy demanding processes via direct esterification or transesterification. Due to the limited solubility of terephthalic acid in typical reaction mixtures, elevated temperatures and pressures are required for a direct esterification process. In the case of transesterification, distillates of low boiling alcohols are obtained which need to be disposed of. In the interest of the environment, there is a drive for soil release polymers, which can be prepared by more benign production processes.

Therefore, it was the object of the present invention to provide new soil release polyesters which are based on renewably sourced raw materials and which, due to their more hydrophilic structure, are easier to formulate in liquid laundry detergents.

Surprisingly, it has been found that this problem can be solved by polyesters comprising structural elements based on 2,5-furandicarboxylic acid.

Therefore, the present invention provides polyesters comprising two or more structural units (a1), one or more structural units (a2) and either one or two terminal groups (a3)

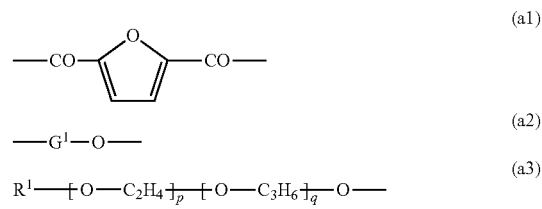

wherein
$G^1$ is one or more of $(OC_nH_{2n})$ with n being a number of from 2 to 10, preferably from 2 to 6 and more preferably $(OC_2H_4)$, $(OC_3H_6)$, $(OC_4H_8)$ or $(OC_6H_{12})$,
$R^1$ is $C_{1-30}$ alkyl, preferably $C_{1-4}$ alkyl and more preferably methyl,
p is, based on a molar average, a number of from 1 to 200, preferably from 2 to 150 and more preferably from 3 to 120,
q is, based on a molar average, a number of from 0 to 40, preferably from 0 to 30, more preferably from 0 to 20, and most preferably from 0 to 10, where
the $(OC_3H_6)$— and $(OC_2H_4)$-groups of the terminal group (a3) may be arranged blockwise, alternatingly, periodically and/or statistically, preferably blockwise and/or statistically,
either of the groups $(OC_3H_6)$— and $(OC_2H_4)$— can be linked to $R^1$— and —O, adjacent structural units (a1) are connected by the structural unit (a2), in the case that only one terminal group (a3) is present in the polymer, the other terminal group is selected from the group consisting of OH, $OCH_3$, and $G^1OH$, and
both terminal groups may only be linked to structural unit (a1).

Certain highly hydrophilic ethylene furanoate/polyethyleneglycol furanoate co-polymers have already been disclosed in the prior art, for example in JP 2015-105373 A, either such polymers and their use as soil release additives for hydrophilic fabrics, such as cotton are described. However, the more hydrophobic derivatives were not sufficiently water soluble. Moreover, there is no mention of their use on polyester fabrics.

One advantage of the polyester of the invention is that in laundry detergent compositions they lead to a high content of renewably based carbon, in cases where the amount of structural units (a1) and (a2) in the polymer is high.

In the polyesters of the invention structural units (a1) are linked via structural unit (a2), which results in the following structural entity:

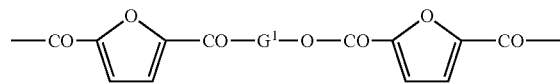

The terminal group (a3) may not be linked to structural unit (a2) but may be linked to structural unit (a1), which results in the following structural entity:

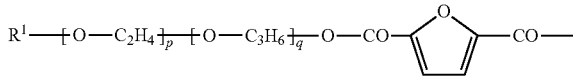

In the case that one polyester molecule comprises two or more of structural units (a2), the definition of the group $G^1$ may, in these structural units (a2). Furthermore, in the case that one polyester molecule comprises two of the terminal groups (a3) the definition of $R^1$ may vary in these terminal groups.

In the case that both p and q of the terminal group (a3) adopt non-zero values, the $(OC_3H_6)$— and $(OC_2H_4)$-groups may be arranged blockwise, alternatingly, periodically and/or statistically, preferably blockwise and/or statistically. This means that in one instance the groups $(OC_3H_6)$— and $(OC_2H_4)$— may be arranged, for example, in a purely statistically or blockwise form but may also be arranged in a form which could be considered as both statistical and blockwise, e.g. small blocks of $(OC_3H_6)$— and $(OC_2H_4)$— arranged in a statistical manner, or in a form where adjacent instances of statistical and blockwise arrangements of the groups $(OC_3H_6)$— and $(OC_2H_4)$— exist.

Both of $(OC_3H_6)$— and $(OC_2H_4)$— may be bonded to $R^1$— and —O. This means for example, that both $R^1$— and —O may be connected to a $(OC_3H_6)$— group, they may both be connected to a $(OC_2H_4)$— group or they may be connected to different groups selected from $(OC_2H_4)$— and $(OC_3H_6)$—.

In the polyesters of the invention, the sum of p and q of the terminal group (a3), based on a molar average, is preferably a number of from 1 to 200, more preferably a number of from 5 to 150 and even more preferably a number of from 10 to 75.

In the polyesters of the invention, $R^1$ is preferably methyl.

In the polyesters of the invention, $G^1$ is preferably $(OC_2H_4)$ or $(OC_3H_6)$.

In one preferred embodiment of the invention, the polyesters of the invention additionally comprise one or more of the structural unit (a4), which may be linked to structural units (a1) or other structural units (a4) via the structural unit (a2), or directly linked to a terminal group:

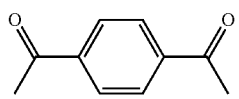 (a4)

In the case that the polyesters of the invention comprise the structural units (a4), these units may be linked to each other or to structural units (a1) via the structural unit (a2), which may result in the following structural entities:

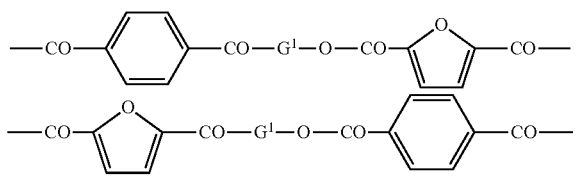

-continued

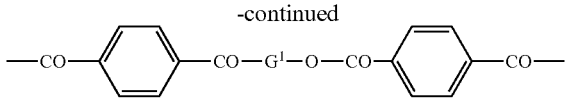

In addition, the terminal group (a3) may also be linked to the structural unit (a4), which results in the following structural entity:

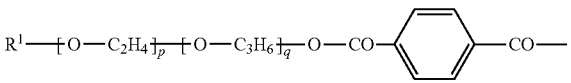

The average molecular weight ($M_w$) of the polyester of the invention is preferably in the range of from 2000 to 20000 g/mol.

The average molecular weight ($M_w$) of the polyester of the invention may be determined by GPC analysis, preferably as detailed in the following: 10 μl of sample is injected onto a PSS Suprema column of dimensions 300×8 mm with porosity 30 Å and particle size 10 μm. The detection is monitored at 235 nm on a multiple wavelength detector. The employed eluent is 1.25 g/l of disodium hydrogen phosphate in a 45/55% (v/v) water/acetonitrile mixture. Separations are conducted at a flow-rate of 0.8 ml/min. Quantification is performed by externally calibrating standard samples of different molecular weight polyethylene glycols.

In the polyesters of the invention, the average number of repeating structural unit (a1) is preferably from 2 to 60, more preferably from 2 to 50, even more preferably from 3 to 40 and most preferably from 4 to 30, and within this preferred embodiment may be 4, 5, 6, 7, 8, 9, 10, 11, 12, 13, 14, 15, 16, 17, 18, 19, 20, 21, 22, 23, 24, 25, 26, 27, 28, 29 or 30.

In the polyesters of the invention, the total amount of the terminal group (a3), based on the total weight of the polyester, is preferably at least 40 wt.-%, more preferably at least 50 wt.-%, even more preferably at least 60 wt.-% and most preferably at least 70 wt.-%.

In the polyesters of the invention, the total amount of structural units (a1) and (a2) and of the terminal group (a3), based on the total weight of the polyester, is preferably at least 50 wt.-%, more preferably at least 60 wt.-%, even more preferably at least 70 wt.-%, and most preferably at least 80 wt.-%.

In one preferred embodiment of the invention, the amount of structural unit (a4) in the inventive polyesters, based on the total weight of the polyester, is preferably at least 0.1 wt.-%, more preferably from 0.1 wt.-% to 50 wt.-%, and even more preferably from 0.5 wt.-% to 40 wt.-%.

In another preferred embodiment of the invention, the structural units are exclusively selected from the group consisting of repeating structural units (a1) and (a2).

In one particularly preferred embodiment of the invention, the polyesters of the invention, described in the following and further referred to as "Polyester A", comprise structural units exclusively selected from the group consisting of structural units (a1) and (a2) and the terminal group (a3), where two or more of structural units (a1), one or more of structural units (a2) and either one or two of the terminal groups (a3) must be present

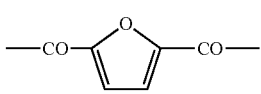 (a1)

-continued

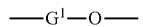  (a2)

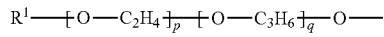  (a3)

wherein
$G^1$ is $(OC_3H_6)$
$R^1$ is $CH_3$,
p is based on a molar average, a number of from 10 to 50,
q is 0.

In Polyester A, adjacent structural units (a1) are connected by structural unit (a2). Furthermore, in the case that only one terminal group (a3) is present in the polymer, the other terminal group is selected from the group consisting of OH, $OCH_3$, and $G^1OH$. Both terminal groups may only be linked to the structural unit (a1).

In Polyester A, the average number of structural units (a1) is preferably from 2 to 30, more preferably from 3 to 20, and even more preferably from 4 to 15.

The average molecular weight ($M_w$) of Polyester A is preferably from 2000 to 20000 g/mol.

In another particularly preferred embodiment of the invention, the polyesters of the invention, described in the following and further referred to as "Polyester B", comprise structural units exclusively selected from the group consisting of structural units (a1) and (a2) and the terminal group (a3), where two or more of the repeating structural units (a1), one or more of the repeating structural units (a2) and either one or two of the terminal groups (a3) must be present

  (a1)

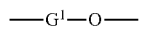  (a2)

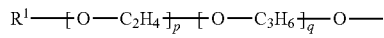  (a3)

wherein
$G^1$ is $(OC_3H_6)$;
$R^1$ is $CH_3$;
p is, based on a molar average, a number of from 10 to 50 and
q is, based on a molar average, a number of from 2 to 5.

In Polyester B, adjacent structural units (a1) are connected by the structural unit (a2). Furthermore, in the case that only one terminal group (a3) is present in the polymer, the other terminal group is selected from the group consisting of OH, $OCH_3$, and $G^1OH$. Both terminal groups may only be linked to the structural unit (a1). Furthermore, the $(OC_3H_6)$— and $(OC_2H_4)$-groups of the terminal group (a3) are arranged blockwise.

In Polyester B, the average number of structural units (a1) is preferably from 2 to 30, more preferably from 3 to 20, and even more preferably from 4 to 15.

The average molecular weight ($M_w$) of Polyester B is preferably from 2000 to 20000 g/mol.

The groups —$OC_2H_4$— in the structural units "$R^1$—$(OC_2H_4)_p$—$(OC_3H_6)_q$—O—" and in the structural units $G^1$ are of the formula —O—$CH_2$—$CH_2$—.

The groups —$OC_3H_6$— in the structural units "$R^1$—$(OC_2H_4)_p$—$(OC_3H_6)_q$—O—" and in the structural units $G^1$ are of the formula —O—$CH(CH_3)$—$CH_2$— or —O—$CH_2$—$CH(CH_3)$—, i.e. of the formula

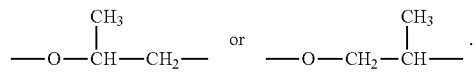

The groups $(OC_4H_8)$ in the structural units $G^1$ are preferably of the formula —O—$CH(CH_3)$—$CH(CH_3)$—, i.e. of the formula

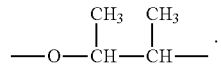

The groups $(OC_6H_{12})$ in the structural units $G^1$ are preferably of the formula —O—$CH_2$—$CH(n-C_4H_9)$— or —O—$CH(n-C_4H_9)$—$CH_2$—, i.e. of the formula

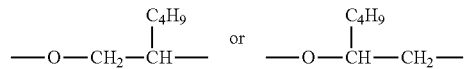

The invention further provides polyesters obtainable through a polymerization reaction of the following monomers:
I) 2,5-furandicarboxylic acid or its ester,
II) one or more alkylene glycols of the formula $HOC_nH_{2n}OH$, with n being a number of from 2 to 10, preferably from 2 to 6 and more preferably $HOC_2H_4OH$, $HOC_3H_6OH$, $HOC_4H_8OH$ or $HOC_6H_{12}OH$,
III) one or more alkyl capped polyalkylene glycols of the formula

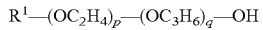

wherein
$R^1$ is a $C_{1-30}$ alkyl, preferably a $C_{1-4}$ alkyl and more preferably methyl, the $(OC_3H_6)$— and $(OC_2H_4)$-groups may be arranged blockwise, alternating, periodically and/or statistically, preferably blockwise and/or statistically, and wherein the connections of the groups $(OC_3H_6)$— and $(OC_2H_4)$— can be linked to $R^1$— and —OH,
p is based on a molar average, a number of from 1 to 200, preferably from 2 to 150 and more preferably from 3 to 120,
q is based on a molar average, a number of from 0 to 40, preferably from 0 to 30, more preferably from 0 to 20, and most preferably from 0 to 10,
IV) optionally one or more further monomers, that are different from the monomers I) to III), preferably selected from the group consisting of aromatic dicarboxylic acids, their derivatives and the salts thereof, more preferably terephthalic acid, phthalic acid, isophthalic acid, 3-sulfophthalic acid, 4-sulfophthalic acid, 5-sulfoisophthalic acid and their salts, and even more preferably terephthalic acid and its ester.

The polyesters of the invention obtainable through a polymerization reaction of the monomers I), II), III) and optionally IV) are referred to in the following as "Polyester C".

The sum of p and q in monomer III), based on a molar average, is preferably a number of from 1 to 200, more preferably a number of from 5 to 150 and even more preferably a number of from 10 to 75.

$R^1$ in the definition of monomer III) is preferably methyl. Monomer II) is preferably $HOC_2H_4OH$ or $HOC_3H_6OH$.

The one or more optional monomers IV) are preferably selected from the group consisting of aromatic dicarboxylic acids, their derivatives and the salts thereof, more preferably terephthalic acid, phthalic acid, isophthalic acid, 3-sulfophthalic acid, 4-sulfophthalic acid, 5-sulfoisophthalic acid and their salts, and even more preferably terephthalic acid and its ester.

The average molecular weight ($M_w$) of Polyester C is preferably from 2000 to 20000 g/mol.

The average number of repeating structural units of Polyester C resulting from monomer I) in the polymerization is preferably from 2 to 60, more preferably from 2 to 50, even more preferably from 3 to 40 and most preferably from 4 to 30.

The amount of Polyester C resulting from monomer III) in the polymerization, based on the total weight of the polyester, is preferably at least 40 wt.-%, more preferably at least 50 wt.-%, even more preferably at least 60 wt.-% and most preferably at least 70 wt.-%.

The amount of structural units of Polyester C resulting from monomers I) and II) in the polymerization plus the amount of terminal groups resulting from monomer III), based on the total weight of the polyester, is preferably at least 50 wt.-%, more preferably at least 60 wt.-%, even more preferably at least 70 wt.-%, and most preferably at least 80 wt.-%.

The amount of Polymer C resulting from optional monomer IV) in the polymerization, based on the total weight of the polyester, is preferably at least 0.1 wt.-%, more preferably from 0.1 wt.-% to 50 wt.-%, and even more preferably from 0.5 wt.-% to 40 wt.-%.

Preferably, Polyester C is obtainable through polymerizing exclusively monomers I), II) and III).

In another preferred embodiment of the invention, the polyesters of the invention, described in the following and further referred to as "Polyester $A^1$", are obtainable through a polymerisation reaction of the following monomers:

I) 2,5-furandicarboxylic acid or its ester,
II) $HOC_3H_6OH$,
III) one or more alkyl capped polyalkylene glycols of the formula

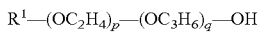
$R^1$—$(OC_2H_4)_p$—$(OC_3H_6)_q$—OH wherein
$R^1$ is $CH_3$,
p is based on a molar average, a number of from 10 to 50 and
q is 0.

In Polyester $A^1$, the average number of structural units resulting from monomer I) is preferably from 2 to 30, more preferably from 3 to 20, and even more preferably from 4 to 15.

The average molecular weight ($M_w$) of Polyester $A^1$ is preferably from 2000 to 20000 g/mol.

In another preferred embodiment of the invention, the polyesters of the invention, described in the following and further referred to as "Polyester $B^1$", are obtainable through a polymerisation reaction of the following monomers:

I) 2,5-furandicarboxylic acid or its ester,
II) $HOC_3H_6OH$ and
III) one or more alkyl capped polyalkylene glycols of the formula

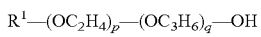
$R^1$—$(OC_2H_4)_p$—$(OC_3H_6)_q$—OH wherein
$R^1$ is $CH_3$,
p is based on a molar average, a number of from 10 to 50 and
q is based on a molar average, a number of from 2 to 5.

In Polyester $B^1$, the average number of repeating structural units resulting from monomer I) is preferably from 2 to 30, more preferably from 3 to 20, and even more preferably from 4 to 15.

The average molecular weight ($M_w$) of Polyester $B^1$ is preferably from 2000 to 20000 g/mol.

The inventive polyesters may be used in substance, i.e. as such, but may also be provided as solutions. The solutions exhibit beneficial handling properties and are more easily dosed. Preferably, these solutions comprise the polyesters of the invention in an amount of from 25 to 70 weight-% based on the total mass of the solution. Suitable solvents for such solutions are, e.g., water, ethylene glycol, 1,2-propylene glycol, 1,3-propylene glycol, 1,2-butylene glycol, 1,3-butylene glycol, 1,4-butylene glycol, butyl glycol, butyl diglycol and butyl polyglycol.

Therefore, the invention further provides a solution comprising a polyester of the invention in an amount of from 25 to 70 weight-% based on the total mass of the solution.

In a further aspect of the invention there is provided the use of the polyesters of the invention as soil release agents, preferably in washing or laundry detergent compositions and fabric care products.

The polyesters of the invention may advantageously be used in washing or laundry detergent compositions. Besides the polyesters of the invention the washing or laundry detergent compositions may comprise one or more optional ingredients, e.g. they may comprise conventional ingredients commonly used in laundry detergent compositions. Examples of optional ingredients include, but are not limited to builders, surfactants, bleaching agents, bleach active compounds, bleach activators, bleach catalysts, photobleaches, dye transfer inhibitors, color protection agents, anti-redeposition agents, dispersing agents, fabric softening and antistatic agents, fluorescent whitening agents, enzymes, enzyme stabilizing agents, foam regulators, defoamers, malodour reducers, preservatives, disinfecting agents, hydrotropes, fibre lubricants, anti-shrinkage agents, buffers, fragrances, processing aids, colorants, dyes, pigments, anti-corrosion agents, fillers, stabilizers and other conventional ingredients for washing or laundry detergent compositions.

The polyesters of the invention possess a beneficial solubility and, advantageously, are clearly soluble in alkaline compositions such as heavy duty washing liquids. They also possess advantageous soil release properties. In washing or laundry detergent compositions they result in a beneficial washing performance.

For the preparation of the polyesters of the invention, typically a two stage process is used of either direct esterification of diacids and diols or transesterification of diesters and diols, followed by a polycondensation reaction under reduced pressure.

A suitable process for the preparation of the polyesters of the invention comprises heating suitable starting compounds for structural units (a1), (a2), (a3) and optionally (a4) with the addition of a catalyst, to temperatures of 160 to 220° C., expediently beginning at atmospheric pressure, and then continuing the reaction under reduced pressure at temperatures of from 160 to 240° C. Reduced pressure preferably means a pressure of from 0.1 to 900 mbar and more preferably a pressure of from 0.5 to 500 mbar.

Typical transesterification and condensation catalysts known in the art can be used for the preparation of the copolymers, such as antimony, germanium and titanium based catalysts. Preferably, tetraisopropyl orthotitanate (IPT) and sodium acetate (NaOAc) are used as the catalyst system in the synthesis of the inventive polymers.

The polyesters of the invention may advantageously be prepared by a process which comprises heating 2,5-furandicarboxylic acid or its ester, one or more alkylene glycols, and R1—$(OC2H4)_p$—$(OC3H6)_q$—OH, wherein R1, p and q are as described herein, with the addition of a catalyst, to temperatures of from 160 to 220° C., firstly at atmospheric pressure, and then continuing the reaction under reduced pressure at temperatures of from 160 to 240° C.

In a preferred embodiment of the invention, the process is characterized in that
a) furan-2,5-dicarboxylic acid dimethyl ester, one or more alkylene glycols, and $R^1$—$(OC_2H_4)_p$—$(OC_3H_6)_q$—OH, wherein $R^1$, p and q as described herein, and a catalyst are added to a reaction vessel, heated under inert gas, preferably nitrogen, to a temperature of from 160° C. to 220° C. to remove methanol and the pressure is then reduced to below atmospheric pressure, preferably to a pressure of from 200 to 900 mbar and more preferably to a pressure of from 400 to 600 mbar for completion of the transesterification, and
b) in a second step the reaction is continued at a temperature of from 180° C. to 240° C. at a pressure of from 0.1 to 10 mbar and preferably of from 0.5 to 5 mbar to form the polyester.

In a further preferred embodiment of the invention, the process is characterized in that
a) furan-2,5-dicarboxylic acid, one or more alkylene glycols, and $R^1$—$(OC_2H_4)_p$—$(OC_3H_6)_q$—OH, wherein $R^1$, p and q as described herein, and a catalyst are added to a reaction vessel, heated under inert gas, preferably nitrogen, to a temperature of from 160° C. to 220° C. to remove water and then pressure is reduced to below atmospheric pressure, preferably to a pressure of from 200 to 900 mbar and more preferably to a pressure of from 400 to 600 mbar for completion of the esterification, and
b) in a second step the reaction is continued at a temperature of from 180° C. to 240° C. at a pressure of from 0.1 to 10 mbar and preferably of from 0.5 to 5 mbar to form the polyester.

Non-ionic soil release polyesters based on glycol terephthalate or glycol terephthalate/polyglycol terephthalate co-polymers can be prepared by a two stage process of either direct esterification of diacids and diols or transesterification of diesters and diols, followed by a polycondensation reaction under reduced pressure. Due to the limited solubility of terephthalic acid in the reaction mixture elevated temperatures and pressures are required for synthesis via the direct esterification process. In the case of furan-2,5-dicarboxylic acid, the transesterification can be performed efficiently at ambient pressure and moderate temperatures giving a significant energy cost advantage. Furthermore, condensation product water in the direct esterification process has an improved ecological footprint compared to the methanol typically obtained in a transesterification process.

Therefore, the invention further provides a process for the preparation of a polyester according to the embodiments in the above description, characterized in that it comprises heating furan-2,5-dicarboxylic acid, one or more alkylene glycols, and $R^1$—$(OC_2H_4)_p$—$(OC_3H_6)_q$—OH, with the addition of a catalyst, to temperatures of from 160 to 220° C., firstly at atmospheric pressure, and then continuing the reaction under reduced pressure at temperatures of from 160 to 240° C.

Further preferred embodiments of the invention arise from the combination of above described preferred embodiments.

The invention will now be further described with reference to the following non-limiting examples.

EXAMPLES

The examples below are intended to illustrate the invention in detail without, however, limiting it thereto. Unless explicitly stated otherwise, all percentages given are percentages by weight (% by wt. or wt.-%).

Polymer Preparation

General Procedure for the Preparation of the Polyesters of the Examples

The polyester synthesis may be carried out by the reaction of 2,5-furandicarboxylic acid or its ester, alkylene glycols, alkyl capped polyalkylene glycols and optionally dimethyl terephthalate (DMT) using sodium acetate (NaOAc) and tetraisopropyl orthotitanate (IPT) as the catalyst system. The synthesis is a two-step procedure. The first step is a (trans) esterification and the second step is a polycondensation.

(Trans)Esterification

The reactants were weighed into a reaction vessel at room temperature under a nitrogen atmosphere. The mixture was heated to an internal temperature of 65° C. for melting and homogenization, followed by the addition of 200 µl tetraisopropyl orthotitanate.

Within 2 hours, the temperature of the reaction mixture was continuously increased to 210° C. under a weak nitrogen flow and held at this temperature for 2 hours. During the transesterification, methanol was released from the reaction and was distilled out of the system, whereas in the case of an esterification water is released from the reaction and distilled out of the system. After 2 h at 210° C., nitrogen was switched off and the pressure reduced to 400 mbar over 3 h.

Polycondensation

The mixture was heated up to 230° C. At 230° C. the pressure was reduced to 1 mbar over 160 min. Once the polycondensation reaction had started, the glycol or mixture of glycols was distilled out of the system. The mixture was stirred for 4 h at 230° C. and a pressure of 1 mbar. After the end of this time period, the inner pressure of the reaction vessel was set back to 1 bar using $N_2$ and the polymer melt was subsequently removed from the reactor and allowed to solidify.

Key to Reactants Used in the Examples 1 to 14

| | |
|---|---|
| mPEG750 | is mono hydroxy-functional polyethylene glycol monomethyl ether, average molecular weight 0.75 KDa (Polyglykol M 750, Clariant). |
| mPEG2000 | is mono hydroxy-functional polyethylene glycol monomethyl ether, average molecular weight 2 KDa (Polyglykol M 2000, Clariant). |
| mPEG5000 | is mono hydroxy-functional polyethylene glycol monomethyl ether, average molecular weight 5 KDa (Polyglykol M 5000, Clariant). |
| EG | is ethylene glycol |
| PG | is propylene glycol |

-continued

| | |
|---|---|
| FDCME | is furan-2,5-dicarboxylic acid dimethyl ester |
| FDCA | is furan-2,5-dicarboxylic acid |
| FDBE | is furan-2,5-dicarboxylic acid dibutyl ester |
| DMT | is dimethyl terephthalate |
| IPT | is tetraisopropyl orthotitanate |
| NaOAc | is sodium acetate |

TABLE I

Polymer examples 1 to 6

| Component | 1 | 2 | 3 | 4 | 5 | 6 |
|---|---|---|---|---|---|---|
| FDCME | 184.15 | 69.06 | 36.83 | 18.42 | 36.83 | 36.83 |
| FDCA | | | | | | |
| FDBE | | | | | | |
| DMT | | | | 19.42 | | |
| EG | | | 12.41 | | | |
| PG | 121.74 | 45.65 | 15.22 | 30.44 | 30.44 | 30.44 |
| mPEG750 | | | | | | 100 |
| mPEG2000 | 500 | 250 | 100 | 100 | | |
| mPEG5000 | | | | | 100 | |
| IPT | 0.2 | 0.2 | 0.1 | 0.1 | 0.1 | 0.1 |
| NaOAc | 0.5 | 0.5 | 0.25 | 0.3 | 0.3 | 0.3 |

TABLE II

Polymer examples 7 to 13

| Component | 7 | 8 | 9 | 10 | 11 | 12 | 13* |
|---|---|---|---|---|---|---|---|
| FDCME | | | 11.05 | 14.73 | 92.08 | 108.82 | 92.08 |
| FDCA | | 4.59 | | | | | |
| FDBE | 40.23 | | | | | | |
| DMT | | | | | | | |
| EG | | | | | | | |
| PG | 18.26 | 3.65 | 7.3 | 9.13 | 60.87 | 71.94 | 60.87 |
| mPEG750 | | | | | | | |
| mPEG2000 | 100 | 20 | 12 | 10 | 200 | 181.82 | 250 |
| mPEG5000 | | | | | | | |
| IPT | 0.08 | 0.016 | 0.016 | 0.016 | 0.2 | 0.2 | 0.2 |
| NaOAc | 0.2 | 0.04 | 0.04 | 0.04 | 0.5 | 0.5 | 0.5 |

*In this example the polycondensation temperature was 210° C.

Liquid laundry detergent compositions containing exemplary polyesters A series of exemplary liquid laundry detergent compositions, both excluding and including soil release polymer, were prepared according to Table III.

Key to Ingredients Used in the Compositions of Table A

| | |
|---|---|
| LAS | is $C_{12-14}$ linear alkylbenzene sulfonate, sodium salt |
| SLES 2EO | is sodium lauryl ether sulfate with 2 moles EO (Genapol ® LRO, Clariant). |
| NI 7EO | is $C_{12-15}$ alcohol ethoxylate 7EO nonionic (Genapol ® LA070, Clariant) |
| Fatty Acid | is a $C_{12-18}$ stripped palm kernel fatty acid |
| SRP | is a polyester prepared according to examples from Tables I and II |

TABLE III

Liquid laundry detergent compositions for performance testing

| | wt.-% a.m. | |
|---|---|---|
| Ingredient | 1 | 2 |
| LAS | 5.20 | 5.20 |
| SLES 2EO | 6.50 | 6.50 |
| NI 7EO | 5.20 | 5.20 |
| Fatty Acid | 2.80 | 2.80 |
| Glycerol | 2.40 | 2.40 |
| Ethanol | 1.20 | 1.20 |
| Sodium citrate | 1.70 | 1.70 |
| Sodium tetraborate decahydrate | 2.00 | 2.00 |
| SRP | 0.00 | 1.00 |
| Demin water and NaOH to adjust pH | ad 100 | ad 100 |
| pH Value | 8.4 | 8.4 |
| Appearance at room temperature | clear | clear |

Soil Release Test

The inventive liquid laundry detergent compositions containing the polyesters of component a) and prepared according to the compositions listed in Table III, were tested for their soil release performance according to the "Dirty-Motor Oil" Test (DMO-Test) using a Lini Apparatus. The conditions for the test are listed in Table B.

TABLE IV

Washing conditions - Soil Release Test

| Equipment | Linitest Plus (SDL Atlas) |
|---|---|
| Water hardness | 14° dH |
| Washing temperature | 40° C. |
| Washing time | 30 min |
| Detergent concentration | 4.3 g/l |
| Soiled Fabric:Liquor Ratio | 1:40 |

As test fabric, white polyester and polycotton standard swatches (WFK 30A and WFK 20A, from WFK Testgewebe GmbH) were used. The fabrics were prewashed three times with the stored liquid laundry detergent compositions. The swatches were then rinsed, dried and soiled with 25 μl of dirty motor oil. After 1 hour the soiled fabrics were washed again with the same stored liquid laundry detergent compositions used in the pre-washing step. After rinsing and drying the washed swatches, a measurement of the remission of the stained fabric at 457 nm was made using a spectrophotometer (Datacolor 650).

The soil release performance is shown as an improvement in soil removal of the swatches washed with one of the formulations 2 from Table III compared with formulation 1 of Table III:

$$\Delta R = R_{form\ 2} - R_{form\ 1}$$

The washing results obtained for the liquid laundry detergent compositions comprising the inventive soil release polymers are shown in Table V, expressed as ΔR along with the 95% confidence intervals.

TABLE V

Washing results

| Example No. | Biosourced wt.-% excl. (a3) | Polyester ΔR | Polyester 95% CI | Polycotton ΔR | Polycotton 95% CI |
|---|---|---|---|---|---|
| 1 | 100 | 4.1 | 1.3 | 11.2 | 0.5 |
| 2 | 100 | 3.4 | 0.85 | 11.5 | 1.2 |
| 3 | 100 | 1.1 | 0.50 | 8.3 | 0.8 |
| 4 | 70 | 7.9 | 0.7 | 17.9 | 0.7 |
| 5 | 100 | 0.9 | 0.5 | 9.0 | 0.3 |
| 6 | 100 | 1.6 | 0.6 | 5.3 | 1.2 |
| 7 | 100 | 2.9 | 0.5 | 9.3 | 0.6 |
| 8 | 100 | 2.4 | 0.5 | 11.5 | 0.3 |
| 9 | 100 | 3.6 | 0.8 | 8.7 | 1.1 |
| 10 | 100 | 1.8 | 0.3 | 5.8 | 0.7 |
| 11 | 100 | 4.5 | 0.5 | 9.2 | 0.6 |
| 12 | 100 | 2.7 | 0.5 | 10.9 | 0.6 |
| 13 | 100 | 3.1 | 0.8 | 8.8 | 0.9 |

Biosourced Material Content Calculation

The weight content of bio-sourced material shown in Table V is related to the hydrophobic block of the polymer and calculated according to the theoretical composition comprising the structural units (a1), (a2) and optionally (a4). The excess of used glycol and MeOH of the transesterification are therefore not taken into account in the calculation. The used EG, PG (a2) and furan (a1) components are assumed to be 100% bio sourced.

The biosourced material content, biosourced wt.-%, is then calculated as:

Biosourced wt.-% = 100 − (a4)wt.-%

Where (a4) wt.-% is the weight percentage of structural units (a4) in the resulting polymer.

The invention claimed is:

1. A polyester comprising two or more structural units (a1), one or more structural units (a2) and either one or two terminal structural groups (a3)

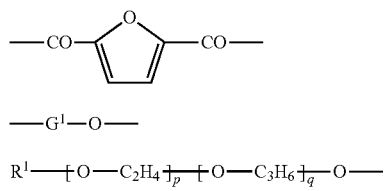

(a1)

—$G^1$—O—    (a2)

$R^1$—$\left[O-C_2H_4\right]_p$—$\left[O-C_3H_6\right]_q$—O—    (a3)

wherein
each $G^1$ is independently $(OC_nH_{2n})$ with n being a number of from 2 to 10,
$R^1$ is a $C_{1-30}$ alkyl,
p is, based on a molar average, a number of from 1 to 200,
q is, based on a molar average, a number of from 0 to 40,
where
the $(OC_3H_6)$— and $(OC_2H_4)$-groups of the terminal group (a3) may be arranged blockwise, alternating, periodically and/or statistically,
either of the groups $(OC_3H_6)$— and $(OC_2H_4)$— can be linked to $R^1$— and —O,
adjacent structural units (a1) are connected by the structural unit (a2), in the case that only one terminal group (a3) is present in the polymer, the other terminal group is selected from the group consisting of OH, $OCH_3$, and $G^1OH$ and
both terminal groups may be only linked to a structural unit (a1).

2. The polyester according to claim 1, characterized in that the sum of p and q, based on a molar average, is a number of from 5 to 150.

3. The polyester according to claim 1, characterized in that $R^1$ is methyl.

4. The polyester according to claim 1, characterized in that each $G^1$ is $(OC_2H_4)$ or $(OC_3H_6)$.

5. The polyester according to claim 1, characterized in that it additionally comprises one or more structural units (a4), which may be indirectly linked to structural units (a1) or other structural units (a4) via the structural units (a2), or directly linked to a terminal group:

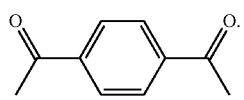

(a4)

6. The polyester according to claim 1, characterized in that the average molecular weight ($M_w$) is from 2000 to 20000 g/mol.

7. The polyester according to claim 1, characterized in that the average number of structural units (a1) is from 2 to 60.

8. The polyester according to claim 1, characterized in that the total amount of terminal group (a3), based on the total weight of the polyester, is at least 40 wt.-%.

9. The polyester according to claim 1, characterized in that the total amount of repeating structural units (a1) and (a2) and of terminal group (a3), based on the total weight of the polyester, is at least 50 wt.-%.

10. The polyester according to claim 5, characterized in that the amount of structural units (a4), based on the total weight of the polyester, is from 0.1 wt.-% to 50 wt.-%.

11. The polyester according to claim 1, characterized in that the structural units are exclusively selected from the group consisting of structural units (a1) and (a2).

12. A process for the preparation of a polyester comprising two or more structural units (a1), one or more structural units (a2) and either one or two terminal structural groups (a3)

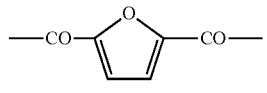

(a1)

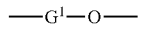

(a2)

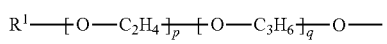

(a3)

wherein
each $G^1$ is independently $(OC_nH_{2n})$ with n being a number of from 2 to 10, $R^1$ is a $C_{1-30}$ alkyl, p is, based on a molar average, a number of from 1 to 200, q is, based on a molar average, a number of from 0 to 40, where the $(OC_3H_6)$— and $(OC_2H_4)$-groups of the terminal group (a3) may be arranged blockwise, alternating, periodically and/or statistically, either of the groups $(OC_3H_6)$— and $(OC_2H_4)$— can be linked to $R^1$— and —O, adjacent structural units (a1) are connected by the structural unit (a2), in the case that only one terminal group (a3) is present in the polymer, the other terminal group is selected from the group consisting of OH, $OCH_3$, and $G^1OH$ and both terminal groups may be only linked to a structural unit (a1) characterized in that it comprises the steps of heating furan-2,5-dicarboxylic acid, one or more alkylene glycols, and $R^1$—$(OC_2H_4)_q$—$(OC_3H_6)_q$—OH, with the addition of a catalyst, to temperatures of from 160 to 220° C., firstly at atmospheric pressure, and then continuing the reaction under reduced pressure at temperatures of from 160 to 240° C.

13. A liquid laundry detergent comprising at least one polyester according to claim 1.

14. A process for washing a fabric comprising the step of contacting the fabric with a polyester comprising two or more structural units (a1), one or more structural units (a2) and either one or two terminal structural groups (a3)

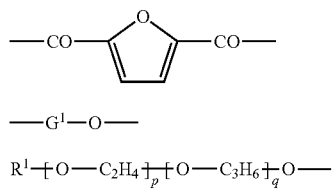

(a1)

—$G^1$—O—  (a2)

$R^1$—[O—$C_2H_4$]$_p$[O—$C_3H_6$]$_q$O—  (a3)

wherein each $G^1$ is independently $(OC_nH_{2n})$ with n being a number of from 2 to 10, $R^1$ is a $C_{1-30}$ alkyl, p is, based on a molar average, a number of from 1 to 200, q is, based on a molar average, a number of from 0 to 40, where the $(OC_3H_6)$— and $(OC_2H_4)$-groups of the terminal group (a3) may be arranged blockwise, alternating, periodically and/or statistically, either of the groups $(OC_3H_6)$— and $(OC_2H_4)$— can be linked to $R^1$— and —O, adjacent structural units (a1) are connected by the structural unit (a2), in the case that only one terminal group (a3) is present in the polymer, the other terminal group is selected from the group consisting of OH, $OCH_3$, and $G^1OH$ and both terminal groups may be only linked to a structural unit (a1).

15. A polyester consisting of two or more structural units (a1), one or more structural units (a2) and either one or two terminal structural groups (a3)

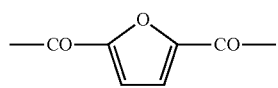

(a1)

—$G^1$—O—  (a2)

$R^1$—[O—$C_2H_4$]$_p$[O—$C_3H_6$]$_q$O—  (a3)

wherein each $G^1$ is independently $(OC_nH_{2n})$ with n being a number of from 2 to 10, $R^1$ is a $C_{1-30}$ alkyl, p is, based on a molar average, a number of from 1 to 200, q is, based on a molar average, a number of from 0 to 40, where the $(OC_3H_6)$— and $(OC_2H_4)$-groups of the terminal group (a3) may be arranged blockwise, alternating, periodically and/or statistically, either of the groups $(OC_3H_6)$— and $(OC_2H_4)$— can be linked to $R^1$— and —O, adjacent structural units (a1) are connected by the structural unit (a2), in the case that only one terminal group (a3) is present in the polymer, the other terminal group is selected from the group consisting of OH, $OCH_3$, and $G^1OH$ and both terminal groups may be only linked to a structural unit (a1).

16. A polyester consisting of two or more structural units (a1), a plurality of structural units (a2), either one or two terminal structural groups (a3), and one or more structural units (a4),

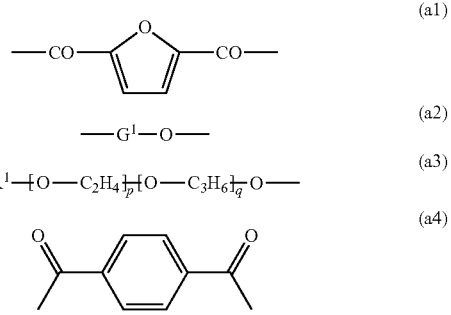

wherein each $G^1$ is independently $(OC_nH_{2n})$ with n being a number of from 2 to 10, $R^1$ is a $C_{1-30}$ alkyl, p is, based on a molar average, a number of from 1 to 200, q is, based on a molar average, a number of from 0 to 40, where the $(OC_3H_6)$— and $(OC_2H_4)$-groups of the terminal group (a3) may be arranged blockwise, alternating, periodically and/or statistically, either of the groups $(OC_3H_6)$— and $(OC_2H_4)$— can be linked to $R^1$— and —O, adjacent structural units (a1) are connected by the structural unit (a2), in the case that only one terminal group (a3) is present in the polymer, the other terminal group is selected from the group consisting of OH, $OCH_3$, and $G^1OH$, both terminal groups may be only linked to a structural unit (a1) or (a4) and wherein structural units (a4) may be indirectly linked to structural units (a1) or other structural units (a4) via the structural units (a2), or directly linked to a terminal group.

\* \* \* \* \*